| United States Patent [19] | [11] | 4,200,522 |
|---|---|---|
| Dorrepaal et al. | [45] | Apr. 29, 1980 |

[54] PROCESS FOR THE FLOTATION OF ORES

[75] Inventors: Wim Dorrepaal; Gerardus M. van den Haak, both of Bodegraven, Netherlands

[73] Assignee: CHEM-Y, Fabriek van chemische produkten B.V., Bodegraven, Netherlands

[21] Appl. No.: 872,030

[22] Filed: Jan. 18, 1978

Related U.S. Application Data

[63] Continuation-in-part of Ser. No. 727,863, Sep. 29, 1976, abandoned.

[51] Int. Cl.$^2$ ............................................. B03D 1/02
[52] U.S. Cl. ................................................... 209/166
[58] Field of Search .................. 209/106, 167; 252/61

[56] References Cited

U.S. PATENT DOCUMENTS

| 2,099,120 | 11/1937 | Kirby | 209/166 |
|---|---|---|---|
| 2,120,217 | 12/1937 | Harris | 209/166 |
| 2,300,827 | 11/1942 | Christmann | 209/166 |
| 2,302,432 | 11/1944 | Cahn | 209/166 |
| 2,312,466 | 3/1944 | Erickson | 209/166 |
| 2,377,129 | 5/1945 | Christmann | 209/160 |
| 3,098,817 | 7/1963 | Buarson | 209/166 |
| 4,034,863 | 7/1977 | Wang | 209/166 |
| 4,081,363 | 3/1978 | Grayson | 209/166 |

FOREIGN PATENT DOCUMENTS

| 461394 | 11/1949 | Canada | 209/166 |
|---|---|---|---|

*Primary Examiner*—Robert Halper
*Attorney, Agent, or Firm*—Browdy and Neimark

[57] ABSTRACT

A process is provided for the flotation of ores, wherein esters of orthophthalic acid or maleic acid with $C_8$–$C_{14}$ alcohols or oleyl alcohol are used as collectors, together with the usual fatty acid type collectors, thus permitting important savings in the use of this latter component. Particular advantages are so obtained in the flotation of phosphate ore and of magnesium-containing minerals.

10 Claims, No Drawings

PROCESS FOR THE FLOTATION OF ORES

CROSS-REFERENCE TO RELATED APPLICATIONS

The present application is a continuation-in-part of U.S. application Ser. No. 727,863, filed Sept. 29, 1976 now abandoned, the entire contents of which are hereby incorporated by reference.

BACKGROUND OF THE INVENTION

1. FIELD OF THE INVENTION

The present invention relates to the flotation of ores, especially phosphate ores, and magnesium-containing minerals, and more specifically to the use of certain esters of dicarboxylic acids as components of the collector.

2. DESCRIPTION OF THE PRIOR ART

The flotation of ores for separating valuable components from gangue is an old and largely used process. For the flotation of most of the salt-type and oxidic minerals traditionally a fatty acid type collector is used. These collectors usually contain oleic acid and are often called "oleic acid", even though some of the commercial collectors may only contain minor amounts of this particular acid. Of course, one will preferably use cheap materials for this purpose so that pure oleic acid is never used. Some usual materials are commercial oleic acid, oleic acid-containing wastes, fatty acids from tall oil, fatty acids from fish oils and the like.

In spite of the fact that the above materials are cheap per se, they do not always yield an effective flotation, when used in economically reasonable amounts, because they are lacking effectivity for some minerals.

A specific problem occurs in the case of phosphate ore which is mainly found as sedimentary rock. Relatively large amounts of fatty acid type collector have to be used for the flotation of the milled phosphate ore, sometimes even up to about 2 kg of collector per ton of ore, which amounts are large compared with the amount of fatty acid collector used in most other flotation processes. However, such large amounts are necessary in order to arrive at a sufficient recovery in the flotation. Of course, it is highly desirable to find a possibility to decrease the necessary amount of collector without adversely influencing the flotation results. Because, as mentioned already, the fatty acid type collectors are cheap materials, a decrease in their use is only economically feasible if further additives are not excessively expensive so that the total cost will not increase. Also, a decrease of the overall amount of collector would be desirable from the point of view of waste disposal.

Another specific problem occurs in the flotation of magnesium-containing minerals, for instance in sellaite and magnesite. Magnesium minerals are usually present together with calcium salts, and in the flotation of such minerals the fatty acid type collectors are much more effective for calcium than for magnesium salts. It would be highly desirable to have a collector which would float the magnesium salts as good as the calcium-containing minerals.

Furthermore, there are other cases where again excessive amounts of fatty acid type collector have to be used. An example of such a further case is the flotation of ilmenite.

An object of the present invention is to provide a collector additive which permits to cut drastically the amount of fatty acid type collector to be used.

A further object of the invention is to provide such an additive which itself is a cheap material which is harmless to the environment.

A still further object is to provide certain additives which are biodegradable.

Another object of the invention is to provide a process for floating phosphate ores with the use of a collector combination of fatty acid type collector and an efficient additive therefor.

Still another object is to provide a process for effectively floating magnesium-containing minerals with the use of a collector combination of fatty acid type collector and an efficient additive therefor.

Further objects and advantages will appear from the following description.

SUMMARY OF THE INVENTION

According to the invention the above objects are obtained by a combination of a usual fatty acid type collector with a mono-ester of a dicarboxylic acid, chosen from the group consisting of orthophthalic acid and maleic acid, and alcohols of 8–14 carbon atoms or oleyl alcohol.

The esters used according to the present application can be simply prepared by heating phthalic or maleic enhydride with the desired alcohol or alcohol mixture above its melting point. Usually, a slight excess of the anhydride, for example 5–10%, is used. The conversion is usually in the order of 95–100% and the crude product of the addition reaction can be used for the present purposes without any further purification. Due to these features the mono-esters used according to the present invention are cheap materials.

The general range of useful alcohols is formed by the $C_8$–$C_{14}$ alcohols and oleyl alcohol. In as far as these alcohols are not too strongly branched, the mono-esters obtained therewith are biodegradable materials which is an additional advantage. If pure alcohols are used for preparing the mono-esters, the $C_8$–$C_{10}$ alcohols are preferred, because esters obtained with the higher saturated alcohols tend to give rather viscous mixtures with the usual fatty type collectors. Among the mono-esters of phthalic acid and pure alcohols, the decyl and oleyl esters are preferred. The technical grade mono-n-decyl and mono-oleyl phthalates have melting points of about 25° C. and yield mixtures with the fatty type collectors which work well and possess a good fluidity.

However, among the saturated alcohols, it is even more preferred to use the commercial alcohol mixtures. These mixtures yield the advantage of the melting point depression always occurring in mixtures so that they yield mixtures of good fluidity with the fatty type collectors over the entire range of $C_8$–$C_{14}$ alcohols. Particularly preferred products are oxoalcohols, such as Dobanol 91, commercially available from Shell, and mainly containing $C_9$–$C_{11}$ alcohols with some branching.

Sometimes flotations are carried out at elevated temperatures and in such cases the use of esters derived from saturated alcohols in the upper part of the above-mentioned range is preferred.

In the flotation of phosphate ores the fatty type collector (commercial oleic acid and the like) is generally used in amounts of 100–4000 grams/ton and especially in amounts of 500–2000 grams/ton. These excessive amounts are necessary, because the success of the flotation depends for a part on external factors which cannot very well be controlled.

By adding the present mono-esters in amounts of generally 10–200 grams per ton of ore, the use of oleic acid or like collector can be decreased by 30 to 70%. Not only does this yield a saving in cost, but also the present mono-esters can influence the effectivity and selectivity of the flotation so that by a judicious choice of the ratio between mono-ester and fatty type collector optimum results can be obtained. The optimum ratios will vary from case to case, depending on the nature of the ore, the nature of the water used, the conditions of temperature and the like and also on the nature and amounts of the regulators. In each separate case the optimum amounts of mono-ester can be determined by simple experimentation.

Another typical case, wherein normally rather excessive amounts of fatty acid type collector have to be used is the flotation of ilmenite. Again, considerable savings in the amount of collector can be attained by replacing a large part of the usual collector with a much smaller amount of the present phthalates or maleates.

Another unexpected effect of the addition of the present mono-esters is that it enables a much better flotation of magnesium fluoride which occasionally is present together with calcium flouride.

With the usual collectors of the fatty acid type a good flotation of $CaF_2$, but a poor flotation of $MgF_2$ is obtained. By the addition of the invention a much better flotation of $MgF_2$ is obtained, if desired even with a decrease in the entire amount of collector.

As appears from the above, and as will further appear hereinafter from the examples, the mono-esters of the invention make it possible to achieve considerable savings in chemicals in flotations of vastly varying ores.

Some examples of suitable mono-esters of the invention ae mono-octyl phthalate, mono-octyl maleate, monodecyl phthalate, monodecyl maleate, monododecyl phthalate, monododecyl maleate, monotetradecyl phthalate, mono-tetradecyl maleate, monophthalate and monomaleate derived from $C_{10}$–$C_{15}$ alcohols (the average number of carbon atoms in this alcohol mixture being about 12), mono-oleylphthalate, mono-oleylmaleate, etc.

The following examples will illustrate the invention without the latter being limited thereby.

EXAMPLE 1

A synthetic ore was used, containing 30% $CaF_2$, 10% $MgF_2$, 10% $BaSO_4$ and 50% silicates. Rougher-flotations were carried out with this ore, without any further processing of either the floated material or the tailings.

a. Rougher-flotation with 500 grams/ton of commercial oleic acid and 500 grams/ton of starch (as $BaSO_4$ depressant). Recoveries: 91% of the $CaF_2$, 12% of the $MgF_2$, 60% of the $BaSO_4$, 9% of the silicates.

b. Rougher-flotation with a mixture of 100 grams/ton of monodecyl phthalate and 500 grams/ton of the oleic acid and 500 grams/ton of starch. Recoveries: 96% of the $CaF_2$, 87% of the $MgF_2$, 66% of the $BaSO_4$, 12% of the silicates.

c. Rougher-flotation with a mixture of 50 grams/ton of monodecyl phthalate and 250 grams/ton of the oleic acid and 500 grams/ton of starch. Recoveries: 92% of the $CaF_2$, 71% of the $MgF_2$, 58% of the $BaSO_4$, 10% of the silicates.

From these experiments it appears that the oleic acid is not an effective collector for $MgF_2$, and that by adding a small amount of an ester of the invention the $MgF_2$ recovery dramatically increases with a slight increase of the recoveries of the other components, i.e. a slight decrease in selectivity. Experiment c. shows that half of the oleic acid of Experiment a. can be replaced with only 50 grams/ton of the phthalate, and that in that case comparable results are obtained for the $CaF_2$, $BaSO_4$ and silicates, but that the floated amount of $MgF_2$ again shows a very large increase. Accordingly, this experiment shows that it is possible to use a smaller amount of collector and to attain therewith not only the same recovery of $CaF_2$, but also a much larger recovery of $MgF_2$.

EXAMPLE 2

A sedimentary phosphate ore was used, containing 12% of $P_2O_5$ and quartz as principal gangue mineral. For economical reasons a rather coarse milling is used which often necessitates large overdoses of collector, in order to float sufficiently the coarsest particles of the phosphate ore. Rougher-flotations followed by 2 cleaners were carried out with various collectors.

a. In a conditioner 1500 grams/ton of tall oil acid is added, together with 500 grams/ton of waterglass as silicate depressant. The second cleaner concentrate has a grade of 29.6% of $P_2O_5$ with a recovery of 81%.

b. The above experiment was repeated, but using 1000 grams/ton of tall oil acid instead of the 1500 grams/ton. A grade of 29.9% was obtained with a recovery of 71%.

c. The above experiments were repeated, but this time replacing the 1500 grams/ton of tall oil with a mixture of 50 grams/ton of the monomaleate of Dobanol 23 (mixture of $C_{12}$ and $C_{13}$-alcohols, commercially available from Shell) and 950 grams/ton of the tall oil acid. A grade of 29.2% was obtained with a recovery of 86%.

d. The above experiments were repeated, but this time with a mixture of 100 grams/ton of monocetyl maleate and 900 grams/ton of tall oil. Hardly any ore was floated as a result of the too high solidifying temperature of this mixture.

e. Experiment a. was repeated again, but this time replacing the 1500 grams/ton of tall oil fatty acid with a mixture of 50 grams/ton of octyl phthalate and 950 grams/ton of the tall oil fatty acid. A grade of 26.1% was obtained with a recovery of 85%.

It should be remarked that in this latter experiment the somewhat lower grade has to be ascribed to excessive frothing, because octyl phthalate in this system also acted as a frother.

f. Experiement a. was repeated, but this time replacing the 1500 grams/ton of tall oil fatty acid with a mixture of 50 grams/ton of mono-oleylphthalate and 950 grams/ton of the tall oil fatty acid. The second cleaner concentrate had a grade of 28.5% of $P_2O_5$ with a recovery of 88%.

g. Experiment f. was repeated, but this time with the same amount of mono-oleylmaleate as "tall oil booster". A grade of 29.2% was obtained with a recovery of 82%.

As appears from the above experiments, one third of the tall oil fatty acid can be replaced with a small amount of an ester of this invention to obtain comparable results. As appears from Experiment d., esters having too high melting points are not suitable.

EXAMPLE 3

Experiments were carried out with a magnesite ore containing 54% MgCO$_3$, 17% MgCa(CO$_3$)$_2$ and for the rest principally silicates. After this ore had been previously conditioned in the usual way with 200 grams/ton of tripolyphosphate as dolomite depressant rougher-flotations were carried out with the following collectors and the following results:

a. With 600 grams/ton of commercial oleic acid. Recovery: 88% of the MgCO$_3$, grade: 91%.

b. With 25 grams/ton of monolauryl phthalate and 600 grams/ton of the oleic acid. Recovery: 94% of the MgCO$_3$, grade: 88%.

c. With 25 grams/ton of monolauryl phthalate and 300 grams/ton of the oleic acid. Recovery: 86% of the MgCO$_3$, grade: 92%.

It appears accordingly that half of the oleic acid can be replaced with a small amount of an ester of this invention to yield approximately the same results. Alternatively, it is possible to increase the recovery of MgCO$_3$ by adding a small amount of the ester to the usual amount of the acid, but in that case the selectivity is somewhat less.

EXAMPLE 4

An ilmenite ore was used containing 45% of FeTiO$_3$, 15% of feldspar and for the rest other silicate minerals. A rougher-flotation followed by two cleaners was carried out using the following collectors with the following results:

a. With 2500 grams/ton of tall oil fatty acid. Recovery: 84% of the TiO$_2$. grade: 44%.

b. With 1000 grams/ton of the tall oil acid with 200 grams/ton of monophthalate of the commercial alcohol Dobanol 91 (Shell). Recovery: 85% of the TiO$_2$, grade: 43%.

c. With 1500 grams/ton of the tall oil fatty acid and 100 grams/ton of mono-maleate of Lial 125 (a mixture of C$_{12}$–C$_{15}$ alcohols, also containing branched-chain alcohols, available from Liquichimica in Italy). Recovery: 88% of the TiO$_2$, grade: 44%.

d. With 1500 grams/ton of the tall oil fatty acid and 150 grams/ton of mono-oleylphthalate. Recovery: 90% of the TiO$_2$, grade 46%.

It follows from these experiments that the excessive amount of tall oil fatty acid which is normally necessary, can be reduced considerably by virtue of the addition of a small amount of an ester of this invention.

EXAMPLE 5

A sedimentary phosphate ore(Florida type) was used which after the usual desliming operation contained 18% P$_2$O$_5$. The ore was floated at pH 10 (NaOH), using 1000 grams/ton of waterglass as regulator. The following collectors were used with the following results:

a. 1500 grams/ton of tall oil fatty acid. Recovery: 89% of the P$_2$O$_5$, based on the flotation feed; grade (after two cleanings): 31.5%.

b. 1000 grams/ton of tall oil fatty acid and 100 grams/ton of mono-isotridecyl maleate (isotridecyl alcohol is a branched-chain alcohol, obtained through the oxo-process). Recovery: 95% of the P$_2$O$_5$ (based on the flotation feed). Grade (after two cleanings): 31.2% P$_2$O$_5$.

Again these experiments show the considerable improvement obtained according to the present invention.

Evidently, various modifications can be made in the light of the discussion and disclosure hereinabove without departing from the scope thereof. Thus, monoesters of phthalic acid or maleic acid, derived from ether-alcohols, such as ethoxylated alcohols can also be used, in as far as these ether-alcohols have sufficiently low melting points. However, such ether-alcohols are not prefered because they may have unpredictable influences on the froth in the flotation.

What is claimed is:

1. A process for the flotation of salt-type minerals and oxide ores comprising using as collector a mixture consisting essentially of a major amount of a fatty acid type collector and a minor amount of a monoester of an acid chosen from the group consisting of orthophthalic and maleic acids with at least one alcohol chosen from the group consisting of alkanols having at least 8 and no more than 14 carbon atoms and oleyl alcohol, and alkanol mixtures containing an average of 8 through 14 carbon atoms the free acid group of said mono-ester remaining unneutralized.

2. In a process for the flotation of phosphate ore with the use of a fatty acid type collector the improvement comprising the replacement of a part of the fatty acid type collector with a smaller amount of a mono-ester of an acid chosen from the group consisting of orthophthalic and maleic acids with at least one alcohol chosen from the group consisting of alkanols having at least 8 and no more than 14 carbon atoms and oleyl alcohol, and alkanol mixtures containing an average of 8 through 14 carbon atoms the free acid group of said mono-ester remaining unneutralized, said improved collector consisting essentially of said fatty acid type collector and said mono-ester.

3. A process according to claim 2, wherein the phosphate ore is of a sedimentary origin.

4. A process according to claim 3, wherein the mono-ester is derived from phthalic acid and an alcohol derived from the oxo-process having an average of 8 through 14 carbon atoms.

5. A process according to claim 1, wherein said mono-ester is mono-n-decyl phthalate.

6. A process according to claim 1, wherein said mono-ester is mono-oleylphthalate.

7. In a process for the flotation of ilmenite with the use of fatty acid type collector the improvement comprising the replacement of a part of the fatty acid type collector with a smaller amount of a mono-ester of an acid chosen from the group consisting of orthophthalic and maleic acids and an alcohol chosen from the group consisting of alkanols containing at least 8 and no more than 14 carbon atoms and oleyl alcohol, and alkanol mixtures containing an average of 8 through 14 carbon atoms the free acid group of said mono-ester remaining unneutralized, said improved collector consisting essentially of said fatty acid type collector and said mono-ester.

8. In a process for the flotation of magnesium-containing minerals with the aid of a fatty acid type collector the improvement comprising the replacement of a part of the fatty acid type collector with a mono-ester of an acid chosen from the group consisting of orthophthalic and maleic acids with an alcohol chosen from the group consisting of alkanols having at least 8 and no more than 14 carbon atoms and oleyl alcohol, and alkanol mixtures containing an average of 8 through 14 carbon atoms the free acid group of said mono-ester remaining unneutralized, said improved collector consisting essentially of said fatty acid type collector and said monester.

9. A process according to claim 8, wherein the magnesium bearing mineral is magnesite.

10. A process according to claim 8, wherein the said magnesium-containing mineral is sellaite.

* * * * *